(12) United States Patent
Lin

(10) Patent No.: US 8,884,887 B2
(45) Date of Patent: Nov. 11, 2014

(54) ELECTRONIC DEVICE WITH TOUCH PANEL AND METHOD FOR CONTROLLING THE SAME

(75) Inventor: Hung-Yi Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 778 days.

(21) Appl. No.: 12/837,200

(22) Filed: Jul. 15, 2010

(65) Prior Publication Data

US 2011/0025623 A1 Feb. 3, 2011

(30) Foreign Application Priority Data

Jul. 29, 2009 (TW) .............................. 98125591 A

(51) Int. Cl.
*G06F 3/041* (2006.01)
*G06F 3/037* (2013.01)
*G06K 11/06* (2006.01)
*G08C 21/00* (2006.01)
*G06F 3/045* (2006.01)

(52) U.S. Cl.
CPC .............. *G06F 3/045* (2013.01); *G06F 3/0416* (2013.01)
USPC ...... 345/173; 345/179; 178/18.03; 178/18.05

(58) Field of Classification Search
USPC ......................................................... 345/173
See application file for complete search history.

(56) References Cited

U.S. PATENT DOCUMENTS

| 5,670,755 A * | 9/1997 | Kwon ........................ 178/18.05 |
| 2004/0070564 A1 | 4/2004 | Dawson et al. |
| 2005/0046621 A1* | 3/2005 | Kaikuranta ................... 345/173 |
| 2009/0120695 A1* | 5/2009 | Liu et al. .................... 178/18.03 |
| 2010/0252335 A1* | 10/2010 | Orsley ........................ 178/18.03 |

FOREIGN PATENT DOCUMENTS

| TW | M291569 | 6/2006 |
| TW | 200921493 | 5/2009 |

* cited by examiner

*Primary Examiner* — Charles V Hicks
(74) *Attorney, Agent, or Firm* — Jianq Chyun IP Office

(57) ABSTRACT

The invention discloses an electronic device with a touch panel and the method for controlling the same. The method includes the steps of: determining that the electronic device is operated in a stylus mode or a general mode; determining that the touch point is an effective touch point when the electronic device is in a stylus mode and the touch point on the touch panel is determined to be the first-type touch point; determining that the touch point is an ineffective touch point when the electronic device is in a stylus mode and the touch point on the touch panel is determined to be a second-type touch point; and determining that the touch point on the touch panel is an effective touch point when the electronic device is in a general mode.

12 Claims, 18 Drawing Sheets

ELECTRONIC DEVICE WITH TOUCH PANEL AND METHOD FOR CONTROLLING THE SAME

FIELD OF THE INVENTION

The invention relates to an electronic device with a touch panel and a method for controlling the same and, more particularly, to an electronic device with a touch panel having multiple input modes and the method for controlling the same.

BACKGROUND OF THE INVENTION

With the fast development of the computer technology, a touch panel is widely used in electronic devices such as a mobile phone, a personal digital assistant (PDA) and so on. The touch panel may almost replace the mouse to be a computer input device.

Generally, after a user generates a touch point on the touch panel, the control circuit in the electronic device may calculate the position of the touch point immediately. After obtaining the position of the touch point, the electronic device may execute the corresponding programs.

There are multiple types of touch panels, and nowadays, a resistive touch panel is the most popular. The operating principle of the resistive touch panel is illustrated hereinbelow.

As shown in FIG. 1A, it is a side view showing a conventional resistive touch panel. Multiple strip-shaped indium tin oxide (ITO) layers 102 are formed on the surface of a transparent glass substrate 100. In addition, multiple strip-shaped ITO layers 112 are formed on the surface of a transparent film 110. The strip-shaped ITO layers 102 on the transparent glass substrate 100 are perpendicular to the strip-shaped ITO layers 112 on the transparent film 110. In addition, multiple transparent spacer dots 120 isolate the strip-shaped ITO layers 102 on the transparent glass substrate 100 and the strip-shaped ITO layers 112 on the transparent film 110 to prevent them from contacting.

When the user presses the transparent film 110 with a finger or a stylus, the strip-shaped ITO layer 112 on the transparent file 110 is transformed and contacts the strip-shaped ITO layer 102 on the transparent glass substrate 100. The control circuit (not shown) of the touch panel calculates the position of the touch point.

As shown in FIG. 1B, it is a top view showing the conventional resistive touch panel. For example, four electrodes are disposed around the touch panel 10. They are a negative Y (Y−) electrode, a positive Y (Y+) electrode, a negative X (X−) electrode and a positive X (X+) electrode. In addition, the strip-shaped ITO layers 102 on the glass substrate are arranged vertically, and the two ends of all the strip-shaped ITO layers are connected to the negative Y (Y−) electrode and the positive Y (Y+) electrode. The strip-shaped ITO layers 112 on the transparent film 110 are arranged horizontally, and the two ends of all the strip-shaped ITO layers 112 are connected to the negative X (X−) electrode and the positive X (X+) electrode. All the strip-shaped ITO layers 102 and 112 may be equivalent to resistors.

In addition, the control circuit 150 is respectively connected to the negative Y (Y−) electrode, the positive Y (Y+) electrode, the negative X (X−) electrode and the positive X (X+) electrode via the Y− line, the Y+ line, the X− line and the X+ line. When touch points are generated on the touch panel 10, the control circuit 150 may obtain the position of the touch point quickly.

As shown in FIG. 2A, it is a schematic diagram showing that whether touch points are generated on the conventional resistive touch panel is detected. First, to get whether the user generates a touch action on the touch panel, the control circuit (not shown) connects a power source (Vcc) to the positive X (X+) electrode, connects the ground end to the negative Y (Y−) electrode, connects the negative X (X−) electrode to the control circuit to provide voltage Va and open the positive Y (Y+) electrode.

Obviously, when the user does not press the touch panel, the upper strip-shaped ITO layers and the lower strip-shaped ITO layers do not contact each other. Therefore, the control circuit may receive the voltage Va at the negative X (X−) electrode which is equal to the voltage Vcc. It represents that the user does not press the touch panel.

When the user presses the touch panel with a stylus 140 or a finger, the upper strip-shaped ITO layers contact the lower strip-shaped ITO layers at the touch point A. Therefore, the control circuit detects that the negative X(X−) electrode receives a voltage $$\left(Va = \frac{(R4 + Rz) \cdot Vcc}{R1 + Rz + R4}\right)$$

which is smaller than the voltage Vcc. That is, it is determined that the user presses the touch panel. The contact resistance Rz is the contact resistance when the two strip-shaped ITO layers contact each other.

As shown in FIG. 2B, it is a schematic diagram showing the process of calculating the horizontal position of the touch point on the conventional resistive touch panel. The control circuit calculates the position of the touch point after it is determined that the user generates a touch action. To obtain the horizontal position of the touch point, when the control circuit detects the touch action, it performs a switching process to connect a power source (Vcc) to the positive X (X+) electrode, connects the ground end to the negative X (X−) electrode, connects the positive Y (Y+) electrode to the control circuit to receive the voltage Vx and open the negative Y (Y−) electrode.

Obviously, the voltage on the positive Y (Y+) electrode is $$Vx = \frac{R2 \cdot Vcc}{R1 + R2}.$$

As shown in FIG. 2B, when the touch point A gets closer to the right side, the voltage Vx is higher, and on the contrary, when the touch point A gets closer to the left side, the voltage Vx is lower. Therefore, the control circuit may convert the voltage Vx via an analog to digital conversion to obtain the horizontal position of the touch point.

As shown in FIG. 2C, it is a schematic diagram showing the process of calculating the touch point on the conventional resistive touch panel. To obtain the vertical position of the touch point A, when the control circuit calculates the horizontal position of the touch point A, it performs the switching process again to connect a power source (Vcc) to the positive Y (Y+) electrode, connect the ground end to the negative Y (Y−) electrode, connect the positive X (X+) electrode to the control circuit to receive the voltage Vy and open the negative X (X−) electrode.

Obviously, the voltage at the positive X (X+) electrode is $$Vy = \frac{R4 \cdot Vcc}{R3 + R4}.$$

As shown in FIG. 2C, when the touch point A gets closer to the upper side, the voltage Vy is higher, and on the contrary, when the touch point A gets closer to the lower side, the voltage Vy is lower. Therefore, the control circuit may convert the voltage Vy via an analog to digital conversion to obtain the vertical position of the touch point.

Obviously, the touch panel is a detecting area surrounded by four electrodes (the negative Y electrode, the positive Y electrode, the negative X electrode and the positive X electrode). In addition, FIG. 2A shows the detection of whether the touch action is generated on the detecting area. When the touch action is generated, the control circuit performs the steps in FIG. 2B and FIG. 2C to obtain the horizontal position and vertical position of the touch point. On the contrary, when the touch action is not generated, the control circuit stays in the state of FIG. 2A and continues waiting for the generation of the touch action.

Since the conventional resistive touch panel is an analog touch panel, when multiple touch points are generated by a user in the touch panel simultaneously, the control circuit is unable to detect multiple touch points, and it may calculate a wrong touch point. For example, as shown in FIG. 3, it is a schematic diagram showing that multiple touch points are generated on the conventional resistive touch panel. The detecting area 160 is defined by four electrodes (not shown). When two touch points A1 and A2 are generated simultaneously in the detecting area 160, supposing that the horizontal position and vertical position of the touch point A1 is (x1, y1), and the horizontal position and vertical position of the touch point A2 is (x2, y2), the control circuit may wrongly detect a third touch point A3. The horizontal position and vertical position of A3 may be detected to be (x1+x2)/2 and (y1+y2)/2.

To detect multiple touch points on the resistive touch panel, the new type of resistive touch panel is developed. As shown in FIG. 4A, it is a schematic diagram showing the resistive touch panel which may detect multiple touch points. In FIG. 4A, the resistive touch panel includes four groups of electrodes (X1+ to X3+, X1 to X3−, Y1+ to Y4+, and Y1− to Y4−). In addition, in the resistive touch panel, the X+ group and X− group have three electrodes, respectively, and the Y+ group and Y− group have four electrodes, respectively. The amount of electrodes in each group is not limited herein, and it may be changed.

In FIG. 4A, three electrodes in a positive X (X+) group are a positive X1 (X1+) electrode, a positive X2 (X2+) electrode and a positive X3 (X3+) electrode; three electrodes in a negative X (X−) group are a negative X1 (X1−) electrode, a negative X2 (X2−) electrode and a negative X3 (X3−) electrode; three electrodes in a positive Y (Y+) group are a positive Y1 (Y1+) electrode, a positive Y2 (Y2+) electrode, a positive Y3 (Y3+) electrode and a positive Y4 (Y4+) electrode; and three electrodes in a negative Y (Y−) group are a negative Y1 (Y1−) electrode, a negative Y2 (Y2−) electrode, a negative Y3 (Y3−) electrode and a negative Y4 (Y4−) electrode. Obviously, four groups of electrodes divide the resistive touch panel into twelve areas. For example, the X1+ electrode, the X1− electrode, the Y1+ electrode and the Y1− electrode form the detecting area $D_{11}$, and others are by parity of reasoning.

In addition, the multiplex switching circuit 230 are connected to all electrodes, and it may selectively connect an X+ line to part or all electrodes in the X+ group, connect an X− line to part or all electrodes in the X− group, connect a Y+ line to part or all electrodes in the Y+ group and connect a Y− line to part or all electrodes in the Y− group according to a control signal of the control circuit 250.

The touch panel which may detect multiple touch points in the embodiment of the invention is illustrated hereinbelow in detail. As shown in FIG. 4B, it is a schematic diagram showing an equivalent circuit during the touch point detecting procedure. To detect whether a touch action is generated on the touch panel 200, the control circuit 250 connects the X+ line to all electrodes in the X+ group, connects the X− line to all electrodes in the X− group, connects the Y+ line to all electrodes in the Y+ group and connects the Y− line to all electrodes in the Y− group. In addition, the control circuit 250 performs the first switching action to connect a power source (Vcc) to the X+ line, connect the ground end to the Y− line, take a signal of the X− line as a determining signal, and open the Y+ line. The control circuit 250 may detect whether a touch action is generated in all areas of the touch panel 200, and the detecting way is the same as that in FIG. 2A, and it is not illustrated herein for a concise purpose.

For example, when the control circuit 250 obtains that the user generates a touch point (such as the touch point B1), the control signal of the control circuit 250 controls the multiplex switching circuit 230 to orderly connect the X− line, the X+ line the Y− line and the Y+ line to the twelve detecting areas and detects whether the touch point is generated in the twelve detecting areas. At last, as shown in FIG. 4C, the touch point B1 is obtained at the area $D_{31}$ defined by the Y1+, Y1−, X3+ and X3− electrodes, and the horizontal position and vertical position of the touch point B1 is obtained. In addition, the way of calculating the position of the touch point B1 is the same as those in FIG. 2B and FIG. 2C, and it is not illustrated again.

Similarly, as shown in FIG. 5, when multiple touch points (such as B1, B2 and B3) are generated at a time by the user, the control circuit 250 obtains that the user generates the touch action. However, the control circuit 250 cannot obtain whether the user generates a single touch point or multiple touch points at the moment.

Then, the control signal of the control circuit 250 controls the multiplex switching circuit 230 to connect the X− line, the X+ line, the Y− line, and the Y+ line to the twelve detecting areas and detects whether the touch point is generated in the twelve detecting areas. At last, it is known that the detecting area $D_{13}$, the detecting area $D_{31}$, the detecting area $D_{33}$ have a touch point, respectively, and the control circuit may calculate the position of the touch point B2 in the detecting area $D_{13}$, the position of the touch point B1 in the detecting area $D_{31}$ and the position of the touch point B3 in the detecting area $D_{34}$.

Sometimes, the user may carelessly generate a plurality of touch points, and the control circuit of the conventional touch panel which may detect multiple touch points also calculates the positions of the touch points. As shown in FIG. 6, when the user operates the touch panel with the stylus 140, he or she always puts the finger 130 or the palm 135 on the touch panel 200. At that moment, the control circuit calculates multiple touch points. However, the touch point generated by the finger or the palm is not the effective touch point.

SUMMARY OF THE INVENTION

The invention discloses a method for controlling an electronic device with a touch panel. The method includes the steps of: determining whether an electronic device is operated in a stylus mode or a general mode; determining that the touch point is an effective touch point when the electronic device is in a stylus mode and the touch point on the touch panel is determined to be the first-type touch point; determining that the touch point is an ineffective touch point when the electronic device is in a stylus mode and the touch point on the touch panel is determined to be a second-type touch point; and determining that the touch point on the touch panel is an effective touch point when the electronic device is in a general mode.

The invention further discloses an electronic device including a resistive touch panel. The resistive touch panel includes: a first-direction first electrode group composed of m electrodes; a first-direction second electrode group composed of m electrodes; a second-direction first electrode group composed of n electrodes; and a second-direction second electrode group composed of n electrodes; a multiplex switching circuit and a control circuit. The 2m+2n electrodes divide the resistive touch panel into m×n detecting areas. The multiplex switching circuit is connected to all the 2m+2n electrodes, and the control circuit is connected to the multiplex switching circuit and controls the multiplex switching circuit and obtains a touch point when a touch action is generated. The control circuit determines a stylus mode or a general mode. When the touch point is determined to be a first-type touch point in the stylus mode, the touch point is determined to be an effective touch point. When the touch point is determined to be a second-type touch point in the stylus mode, the touch point is determined to be an ineffective touch point, and in the general mode, the touch point is determined to be an effective touch point.

These and other features, aspects and advantages of the present invention will become better understood with regard to the following description, appended claims, and accompanying drawings.

DETAILED DESCRIPTION OF THE PREFERRED EMBODIMENT

Figure 7:
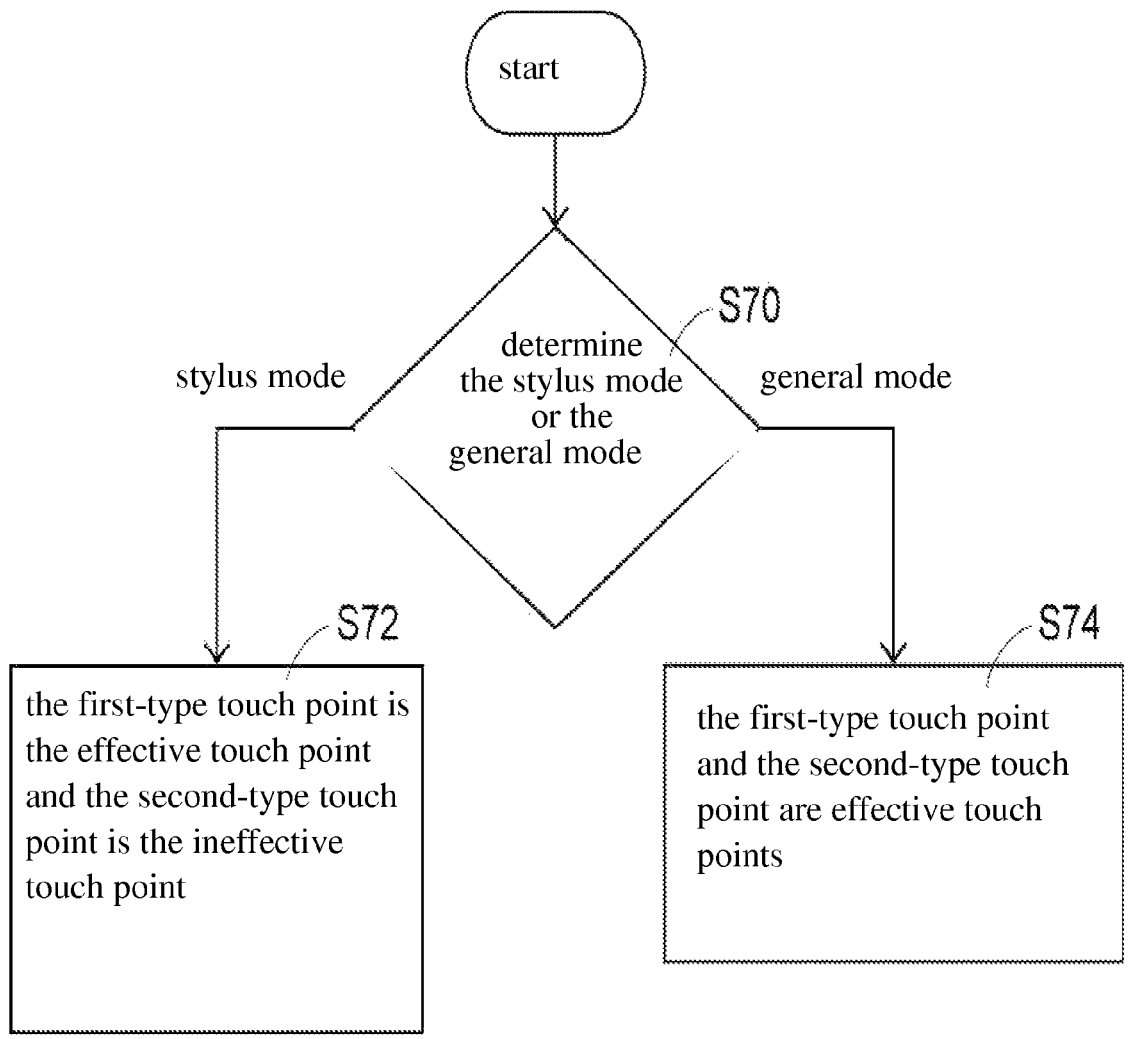
FIG. 7 is a flow chart showing the method for controlling the electronic device with a touch panel in the invention.

FIG. 7 is a flow chart showing the method for controlling the electronic device with a touch panel in the invention. When the electronic device starts, the user may choose options provided in the touch screen to choose different operation modes (step S70). That is, a stylus mode and a general mode are provided. When the user chooses a stylus mode, the control circuit in the electronic device determines whether the touch point generated by the user is a first-type touch point or a second-type touch point, and then sets the first-type touch point to be an effective touch point and the second-type touch point to be an ineffective touch point (step S72). In addition, when the user selects the general mode, the control circuit in the electronic device sets all the touch points generated by the user to be the effective touch points. That is, both the first-type touch point and the second-type touch point are determined to be the effective touch point (step S74).

The way of determining the modes in step S70 also may be other methods. For example, the electronic device usually has a stylus and a corresponding stylus slot. When the user takes the stylus out of the stylus slot, the electronic device may detect the operation and enter the stylus mode. Otherwise, when the user does not take the stylus out of the stylus slot, the electronic device enters the general mode.

In addition, in the embodiment of the invention, the first-type touch point is the small-area touch point such as a stylus touch point, a sharp object touch point, a penpoint touch point and so on, and the second-type touch point is the large-area touch point such as the finger touch point or the palm touch point.

Figure 8A:
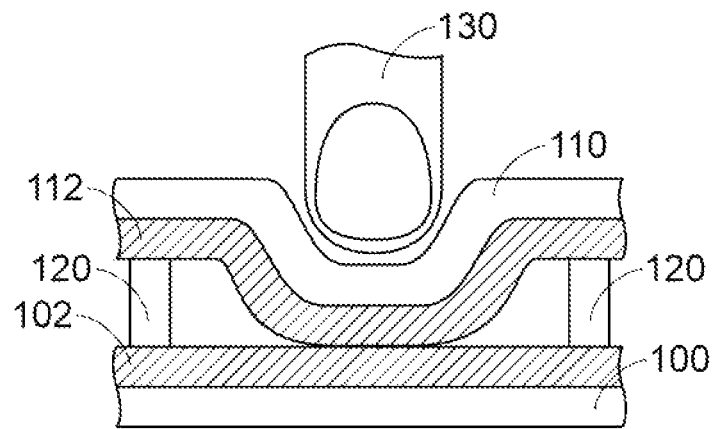
FIG. 8A is a schematic diagram showing that the touch point is generated by a finger.
Figure 8B:
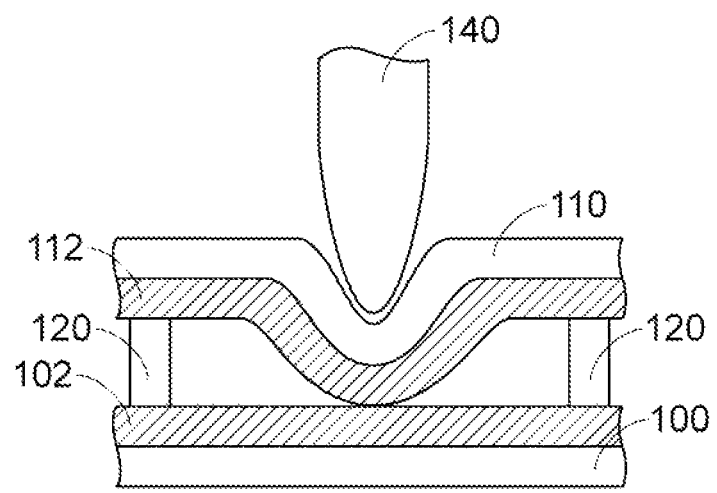
FIG. 8B, it is a schematic diagram showing that the touch point is generated by a stylus.

The method for determining whether the touch point is a first-type touch point or a second-type touch point is illustrated hereinbelow. FIG. 8A is a schematic diagram showing that the touch point is generated by a finger. When a finger 130 presses the touch panel, the contact area between the upper stripe-shaped ITO layer 112 and lower stripe-shaped ITO layer 102 is larger due to the large contact area. Similarly, when the touch point is generated by a palm, the contact area between the upper stripe-shaped ITO layer 112 and lower stripe-shaped ITO layer 102 is also larger. In addition, as shown in FIG. 8B, it is a schematic diagram showing that the touch point is generated by a stylus 140. Since the area of the penpoint of the stylus is small, when the stylus is used to press the touch panel, the contact area between the upper and lower stripe-shaped ITO layers is small. In the invention, the above character is used to determine whether the touch point is the first-type touch point or the second-type touch point.

Generally, to detect multiple touch points accurately, the conventional resistive touch panel which may detect multiple touch points should have multiple detecting areas. In other words, the electrodes in the X+ group, X− group, Y+ group and Y− group are very short, and thus the amount of the detecting areas is larger, and the area of each detecting area is smaller.

Figure 9:
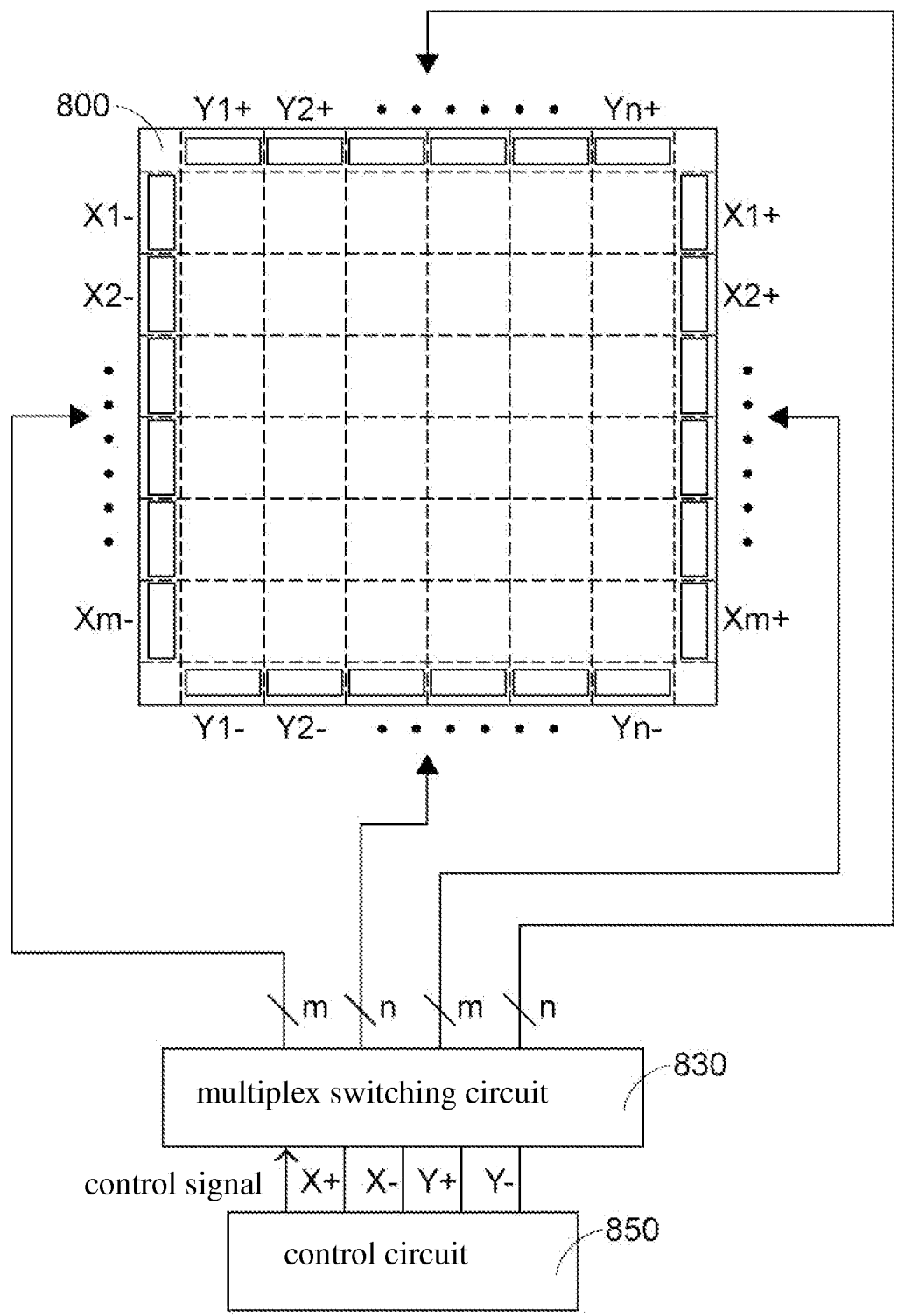
FIG. 9 is a schematic diagram showing the resistive touch panel which may detect multiple touch points.

FIG. 9 is a schematic diagram showing the resistive touch panel which may detect multiple touch points. The resistive touch panel includes four electrode groups, which are an X-direction first electrode group (X1+ to Xm+), an X-direction second electrode group (X1− to Xm−), a Y-direction first electrode group (Y1+ to Yn+) and a Y-direction second electrode group (Y1− to Yn−). The resistive touch panel 800 herein may be divided into m×n detecting areas.

The multiplex switching circuit 830 is connected to all electrodes, and it may selectively connect an X+ line to part or all electrodes in the X+ group, connect an X− line to part or all electrodes in the X− group, connect a Y+ line to part or all electrodes in the Y+ group, and connect a Y− line to part or all electrodes in the Y− group.

First, the touch action is determined. That is, to get whether the user generates the touch point on the touch panel 800, the control circuit 850 connects the X+ line to all electrodes in the X+ group, connects the X− line to all electrodes in the X− group, connects the Y+ line to all electrodes in the Y+ group, and connects the Y− line to all electrodes in the Y− group. In addition, the control circuit 850 performs a first switching action to connect a power source (Vcc) to the X+ line, connect the ground end to the Y− line, take a signal of the X− line as a determining signal and open the Y+ line. At that moment, the control circuit 850 may detect whether the touch action is generated in all area of the touch panel 800 according to the change of the determining signal.

Then, when the control circuit 850 obtains that the touch point is generated by the user, the touch point is searched. During searching for the touch point, the control signal of the control circuit 850 may control the multiplex switching circuit 830 to be orderly connected to the m×n detecting areas and detect whether the touch point is generated on the m×n detecting areas.

Figure 1A:
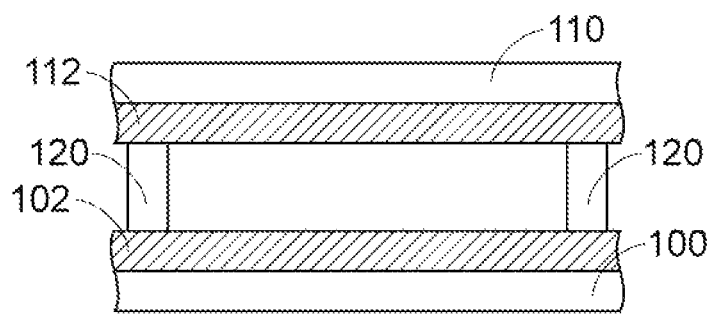
FIG. 1A is a side view diagram showing a conventional resistive touch panel.
Figure 1B:
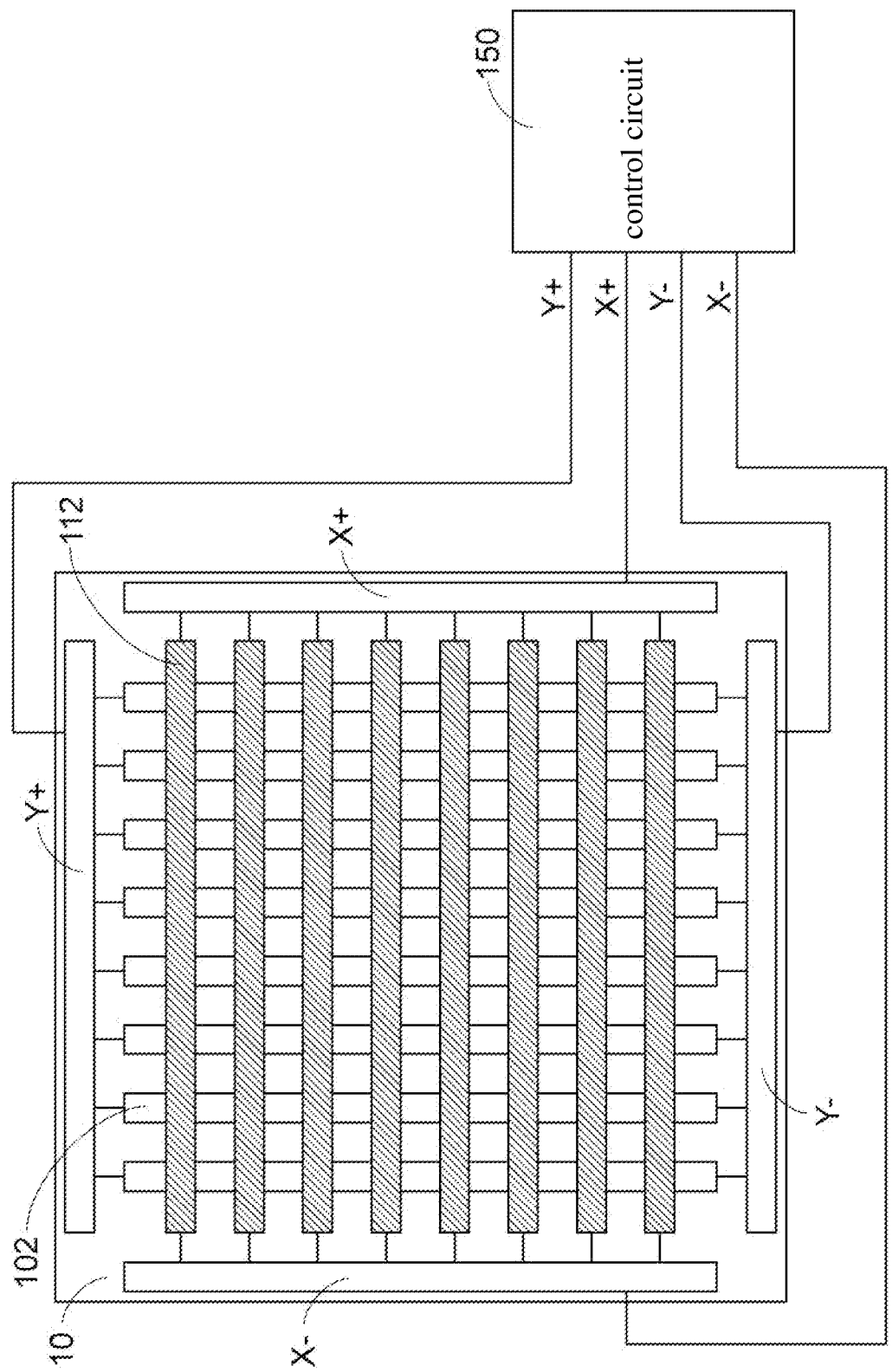
FIG. 1B is a top view diagram showing the conventional resistive touch panel.
Figure 2A:
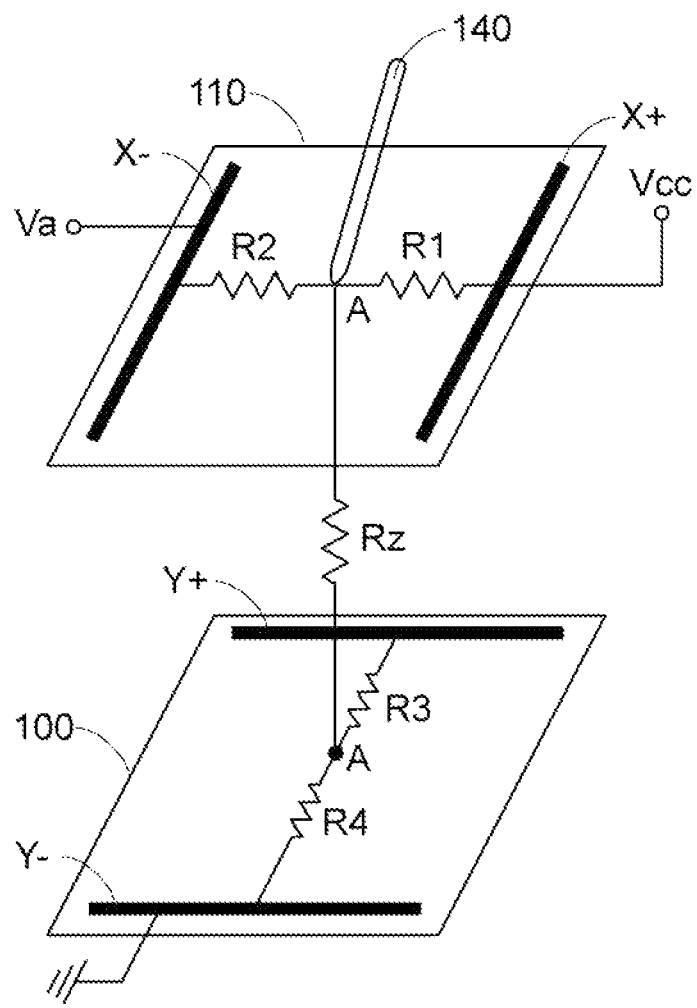
FIG. 2A is a schematic diagram showing that whether touch points are generated on the conventional resistive touch panel is detected.
Figure 2B:
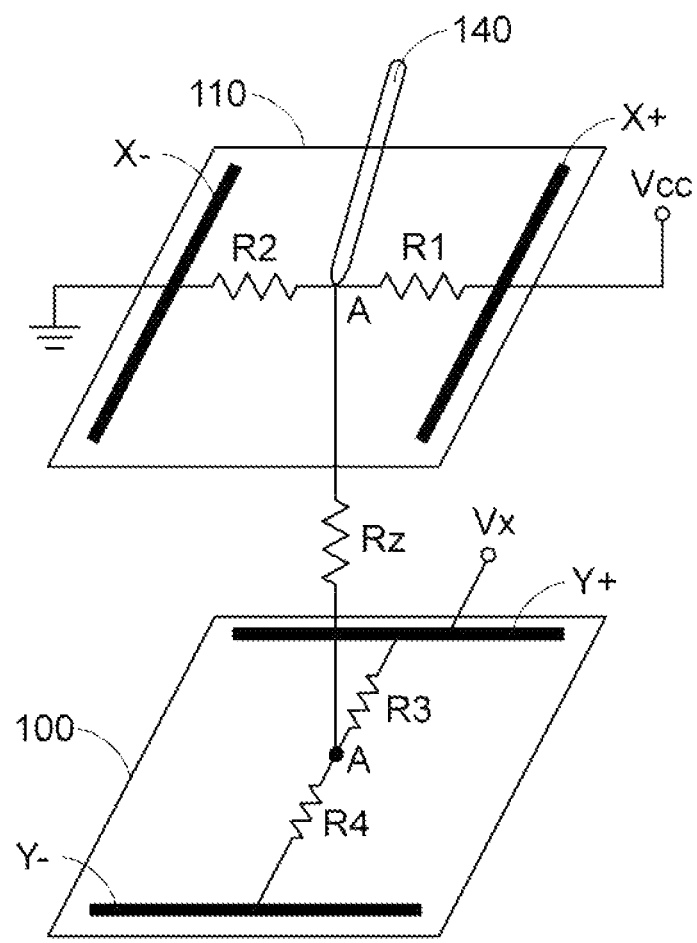
FIG. 2B is a schematic diagram showing the process of calculating the horizontal position of the touch point on the conventional resistive touch panel.
Figure 2C:
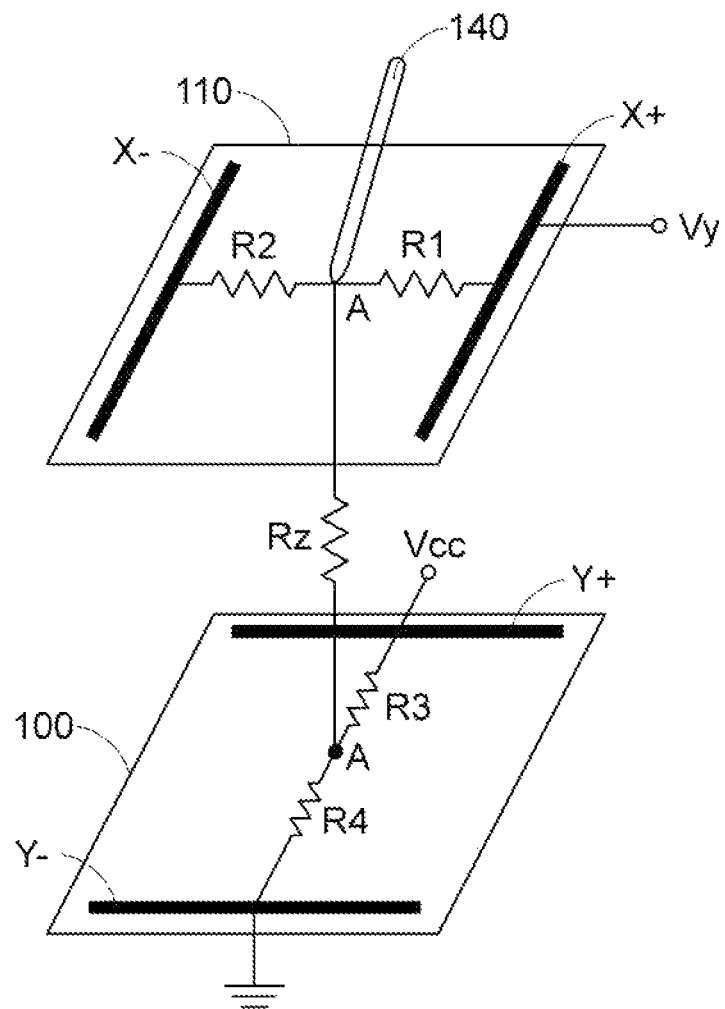
FIG. 2C is a schematic diagram showing the process of calculating the touch point on the conventional resistive touch panel.
Figure 3:
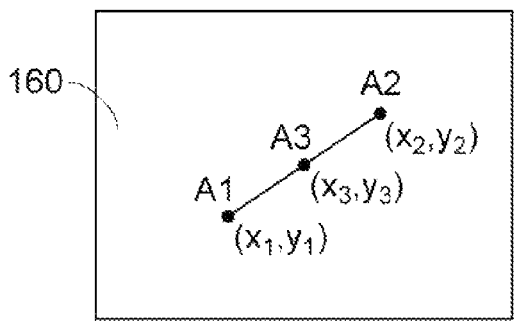
FIG. 3 is a schematic diagram showing that multiple touch points are generated on the conventional resistive touch panel.
Figure 4A:
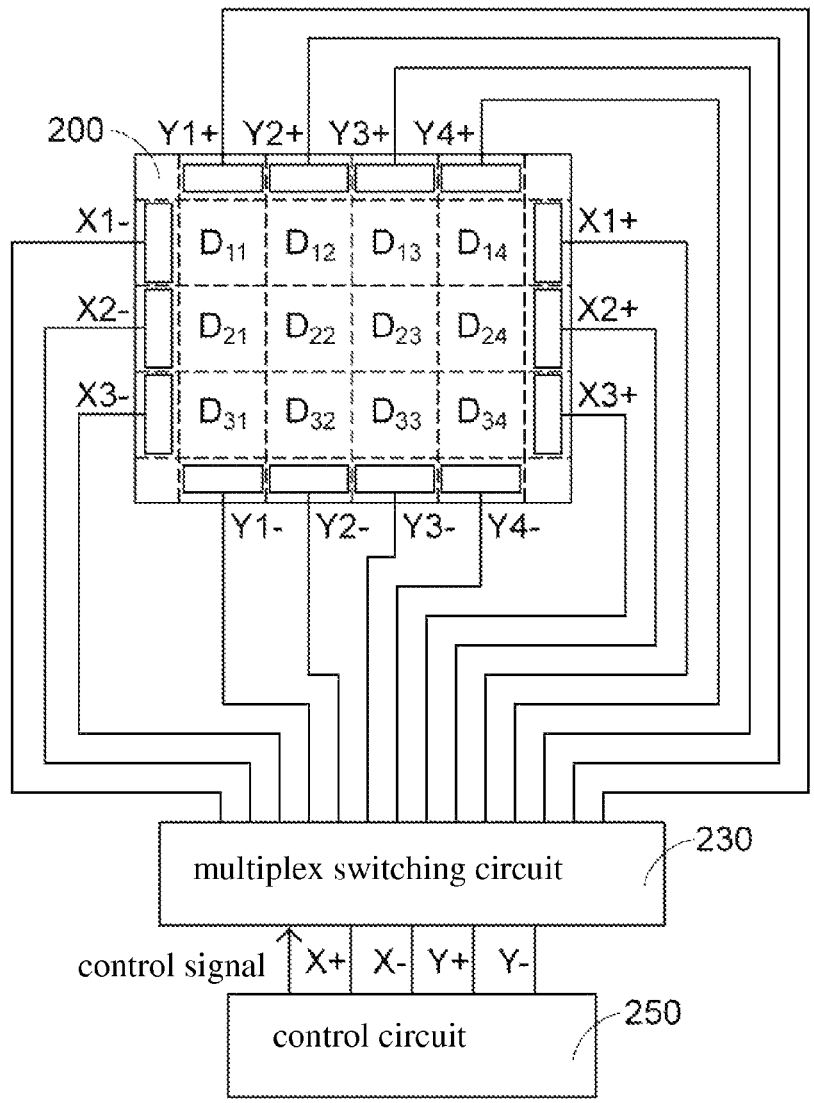
FIG. 4A is a schematic diagram showing the resistive touch panel which may detect multiple touch points.
Figure 4B:
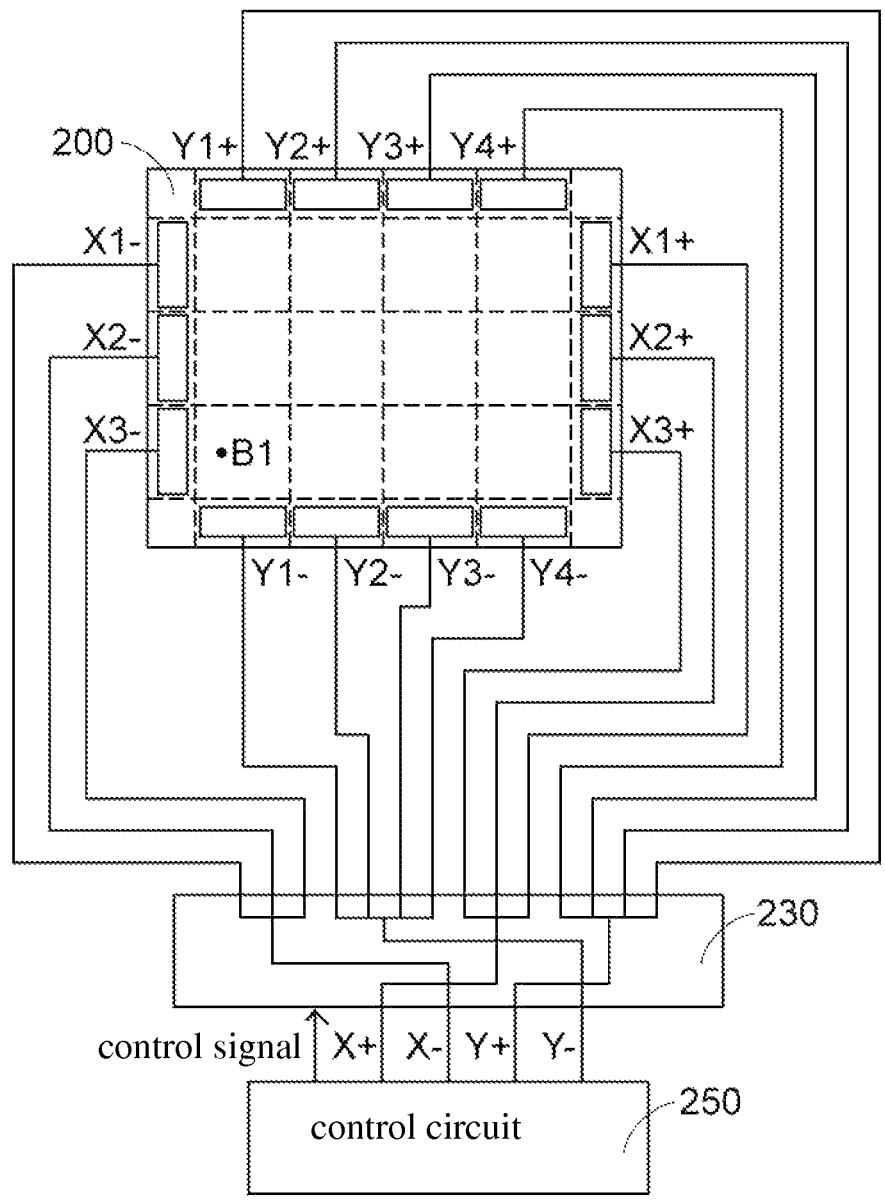
FIGS. 4B and 4C are schematic diagrams showing an equivalent circuit during the touch point detecting procedure.
Figure 4C:
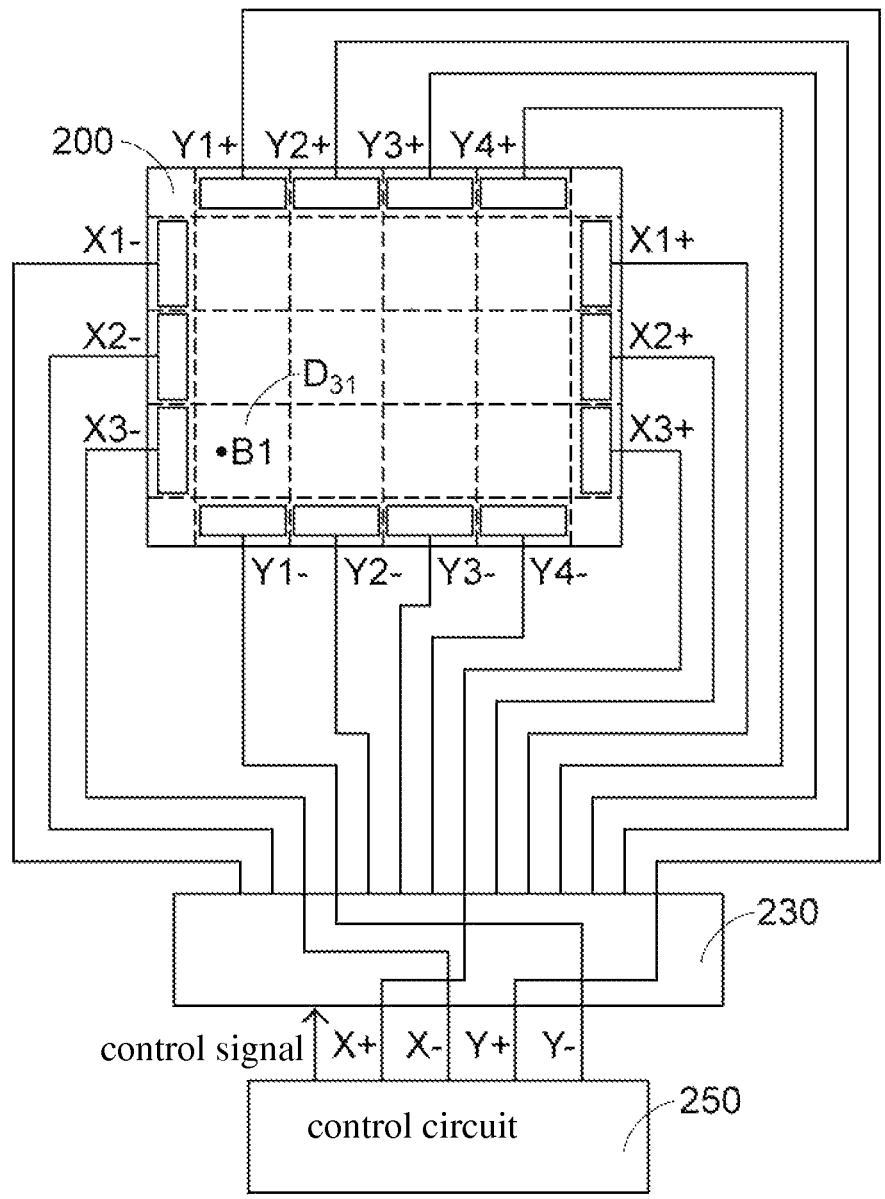
Figure 5:
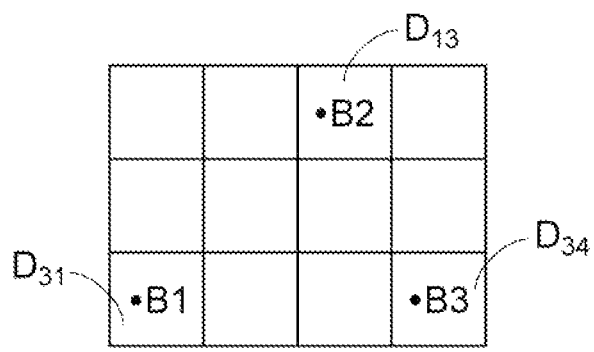
FIG. 5 is a schematic diagram showing that multiple touch points are detected on the resistive touch panel.
Figure 6:
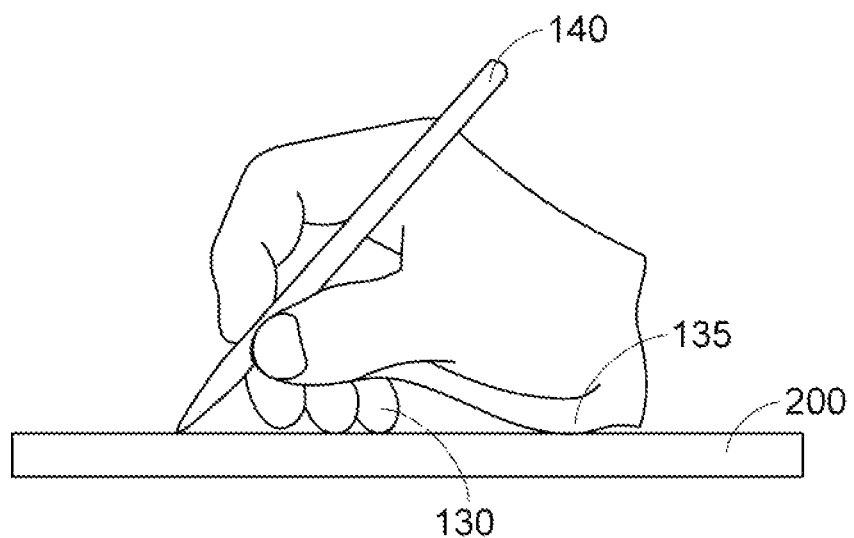
FIG. 6 is a schematic diagram showing that the user operates the touch panel.

When touch points are determined to be generated at one or more of the m×n detecting areas, the control circuit 850 may calculate the horizontal position and vertical position of the touch point in the detecting area. In addition, the method for calculating the position of the touch point is the same as those in FIG. 2B and FIG. 2C, and it is not illustrated herein for a concise purpose.

According to the embodiment of the invention, when the detecting areas are small, if the user touches the touch panel with his or her finger or palm, he or she may easily touch the edge of the detecting area and make the adjacent detecting areas generate multiple touch points at the same time. The touch point type may be determined according to the detecting areas corresponding to the detected multiple touch points.

Figure 10:
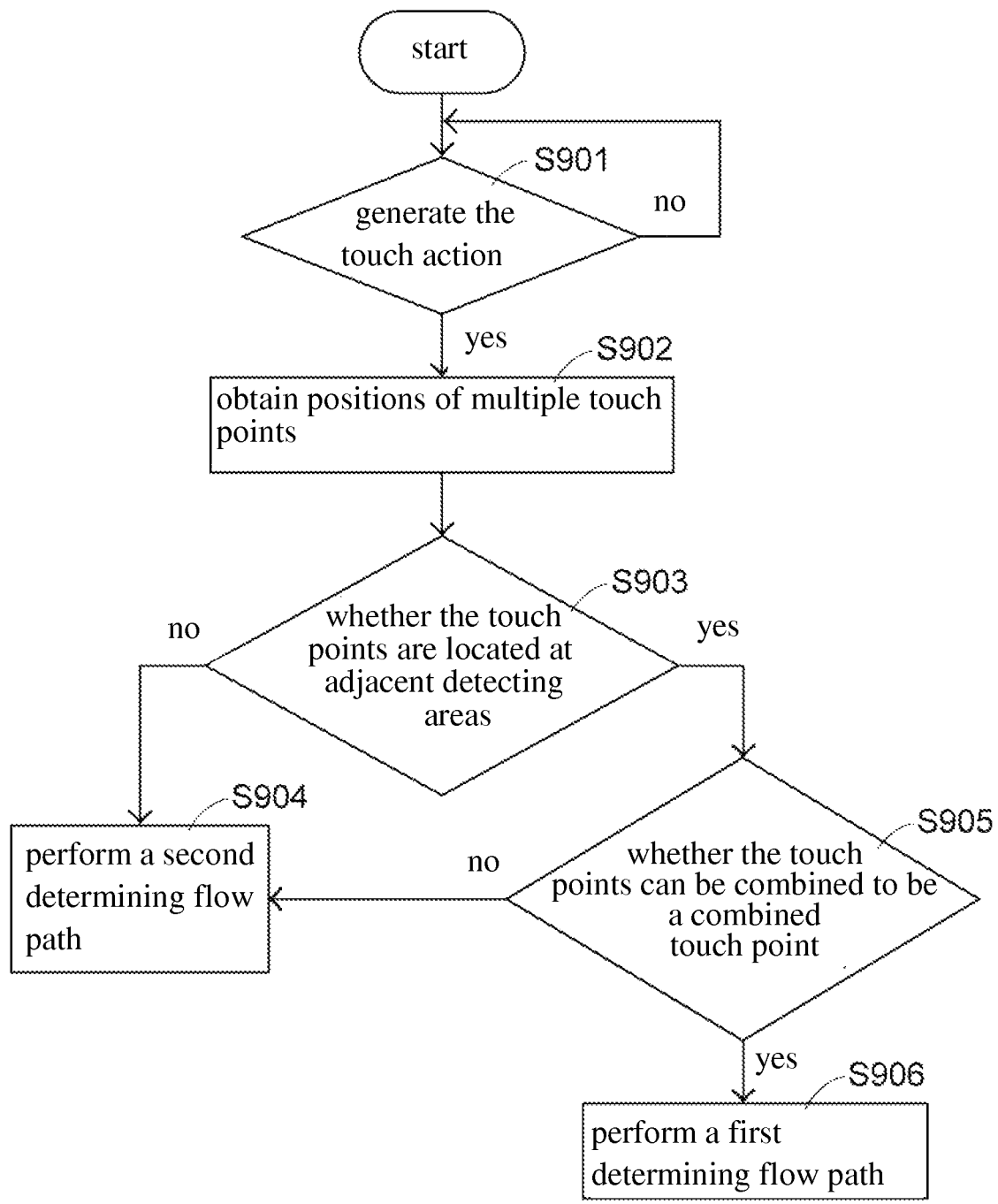
FIG. 10 is a flow path showing the method for determining the touch points.

That is, as shown in FIG. 10, the control circuit continuously detects the touch action before it detects the touch action (step S901). When the control circuit detects the touch action (step S901), it calculates the positions of the touch points and obtains multiple positions of the touch points (step S902). Then, whether the touch points are located at adjacent detecting areas are determined (step S903). When the case in step S903 is "no", the touch point type is further determined according to the second determining flow path (step S904). On the contrary, when the case in step S903 is "yes", whether the touch points can be combined to be a combined touch point is further determined (step S905). When the touch points cannot be combined (step S905), the touch point type is further determined by the second determining flow path (S904). When it is determined that the touch points can be combined (step S905), the touch point type is determined according to the first determining flow path (step S905).

FIG. 11A to FIG. 11D are examples used to illustrate the flow chart in FIG. 10. The touch points in FIGS. 11A and 11B cannot be combined to be a combined touch point, and the touch points in FIG. 11C and FIG. 11D can be combined to be a combined touch point.

Figure 11A:
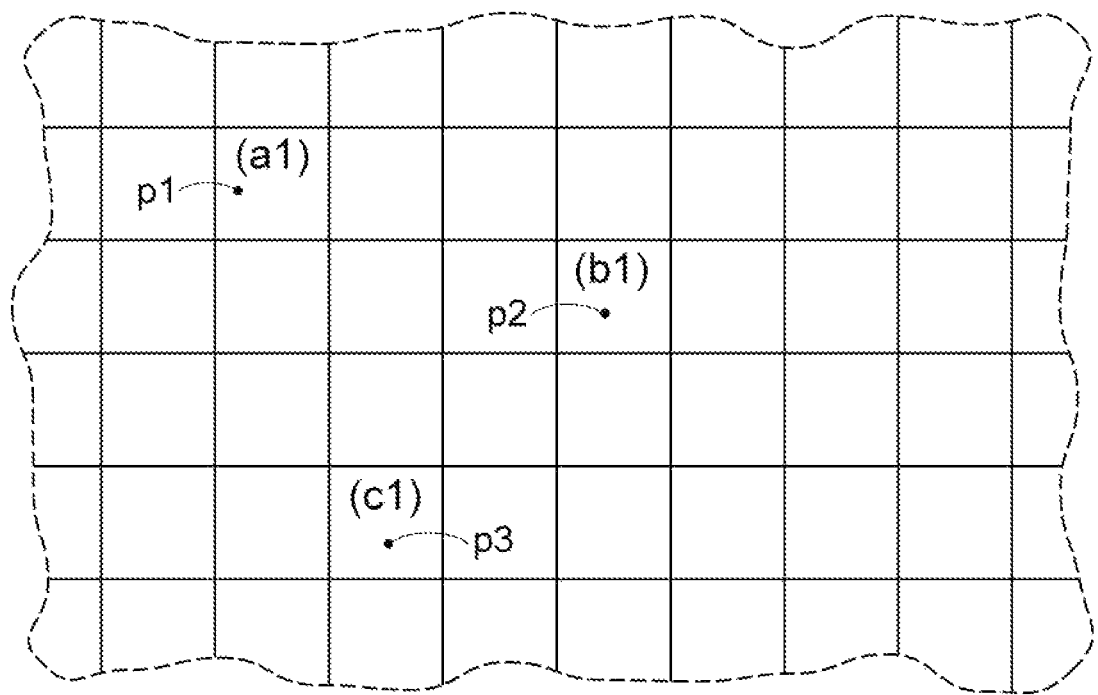
FIG. 11A to FIG. 11D are examples of different touch points.

As shown in FIG. 11A, when the touch action is generated (step S901), the control circuit 850 calculates the position of the touch point p1 in the detecting area (a1), the position of the touch point p2 in the detecting area (b1) and the position of the touch point p3 in the detecting area (c1) (S902). Since the detecting areas (a1), (b1) and (c1) are not adjacent to each other (step S903), the second determining flow path (step S904) is used to determine the touch point types of the touch points p1, p2 and p3.

Figure 11B:
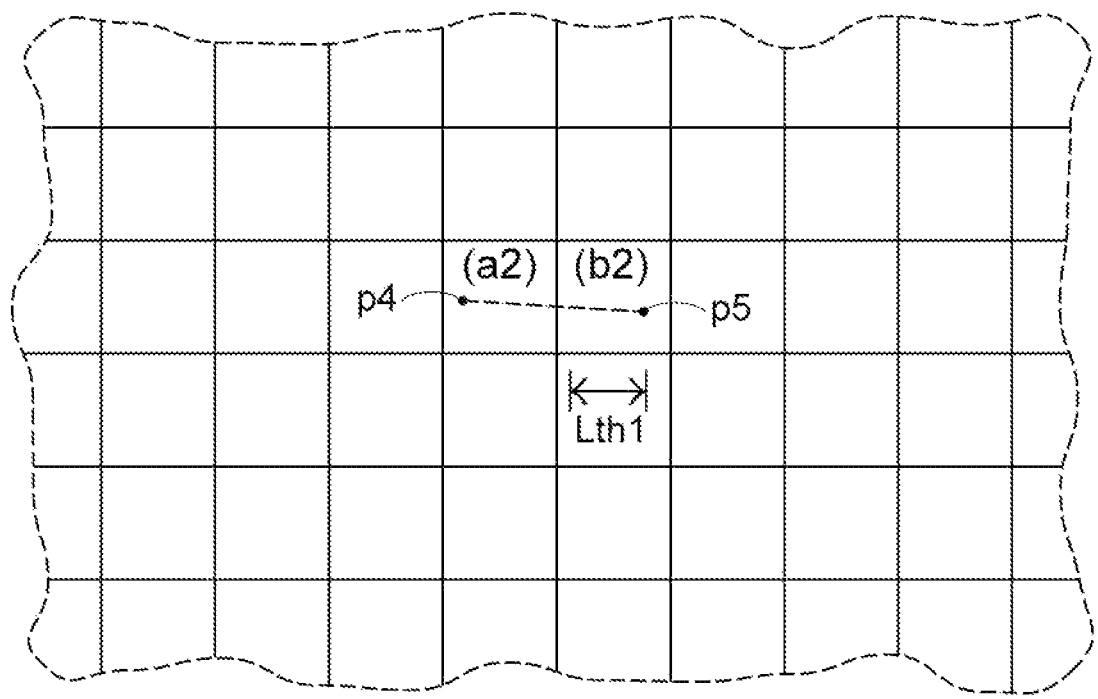

As shown in FIG. 11B, when the touch action is generated (step S901), the control circuit 850 calculates the position of the touch point p4 in the detecting area (a2) and the position of the touch point p5 in the detecting area (b2). Since the detecting areas (a2) and (b2) are adjacent detecting areas (step S903), the control circuit 850 further determines whether the touch points p4 and p5 can be combined (step S905).

At the step of determining whether the touch points can be combined (step S905), a first threshold length (Lth1) may be preset in the control circuit, and the first threshold length (Lth1) is compared with the distance between the touch points p4 and p5. When the distance between p4 and p5 is longer than the first threshold length (Lth1), the touch points p4 and p5 cannot be combined, and the second determining flow path is used to determine the touch point types of the touch points p4 and p5 (step S904).

Figure 11C:
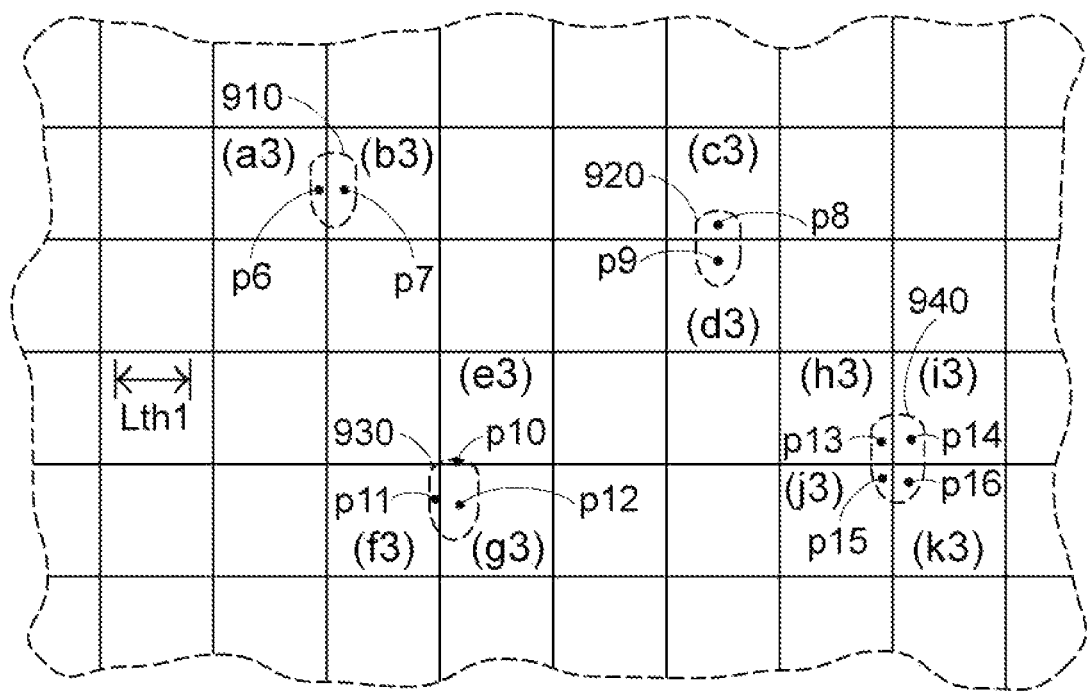

Taking the finger touch point 910 in FIG. 11C as an example, when the touch action is generated (step S901), the control circuit 850 calculates the position of the touch point p6 in the detecting area (a3) and the position of the touch point p7 in the detecting area (b3). Since the detecting areas (a3) and (b3) are adjacent detecting areas (step S903), the control circuit 850 further determines whether touch points p6 and p7 can be combined (step S905).

At the step of determining whether the touch points can be combined (step S905), a first threshold length (Lth1) may be preset in the control circuit, and the first threshold length (Lth1) is compared with the distance between the touch points p6 and p7. The finger touch point 910 generates two touch points p6 and p7 in the adjacent detecting areas (a3) and (b3), respectively, and the distance between the touch points p6 and p7 is shorter than the first threshold length (Lth1). Therefore, the touch points p6 and p7 can be combined, and the first determining flow path is performed (step S906). The combined touch point may be calculated according to the position of the touch points p6 and p7. That is, supposing that the position of p6 is (x6, y6) and the position of p7 is (x7, y7), the position of the combined touch point is $$\left(\frac{x6+x7}{2}, \frac{y6+y7}{2}\right).$$

The finger touch point 920 in FIG. 11C generates the touch points p8 and p9 in adjacent detecting areas (c3) and (d3). The distance between p8 and p9 is shorter than the first threshold length (Lth1), and therefore the touch points p8 and p9 can be combined and the type of the touch points p8 and p9 is determined according to the first determining flow path (step S906). That is, supposing that the position of p8 is (x8, y8) and the position of p9 is (x9, y9), the position of the combined touch point is $$\left(\frac{x8+x9}{2}, \frac{y8+y9}{2}\right).$$

The finger touch point 930 in FIG. 11C generates three touch points p10, p11 and p12 in the adjacent detecting areas (e3), (f3) and (g3). The distance between any two touch points is shorter than the first threshold length (Lth1). Therefore, the touch points p10, p11 and p12 can be combined, and the type of the touch points p10, p11 and p12 is determined according to the first determining flow path (S906). That is, supposing that the position of the touch point p10 is (x10, y10), the position of the touch point p11 is (x11, y11) and the position of the touch point p12 is (x12, y12), the position of the combined touch point is $$\left(\frac{x10+x11+x12}{3}, \frac{y10+y11+y12}{3}\right).$$

The finger touch point 940 in FIG. 11C generates the touch points p13, p14, p15 and p16 in adjacent detecting areas (h3), (i3), (j3) and (k3). The distance between any two adjacent touch points is shorter than the first threshold length (Lth1). Thus, the touch points p13, p14, p15 and p16 can be combined, and the type of the touch points p13, p14, p15 and p16 is determined according to the first determining flow path (step S906). That is, supposing that the position of p13 is (x13, y13), the position of p14 is (x14, y14), the position of p15 is (x15, y15) and position of p16 is (x16, y16), the position of combined touch point is $$\left(\frac{x13+x14+x15+x16}{4}, \frac{y13+y14+y15+y16}{4}\right).$$

Similarly, when a stylus touch point touches the edge of the detecting areas, the touch points are generated in adjacent detecting areas at the same time. The stylus touch point 960 in FIG. 11D generates two touch points in two adjacent detecting areas (a4) and (b4). The two touch points are very close to each other. The distance between the two touch points generated by the stylus is shorter than the first threshold length (Lth1). Therefore, the two touch points can be combined, and the touch points type is determined according to the first determining flow path (S906). Similarly, the position of the combined touch point also may be calculated.

Figure 11D:
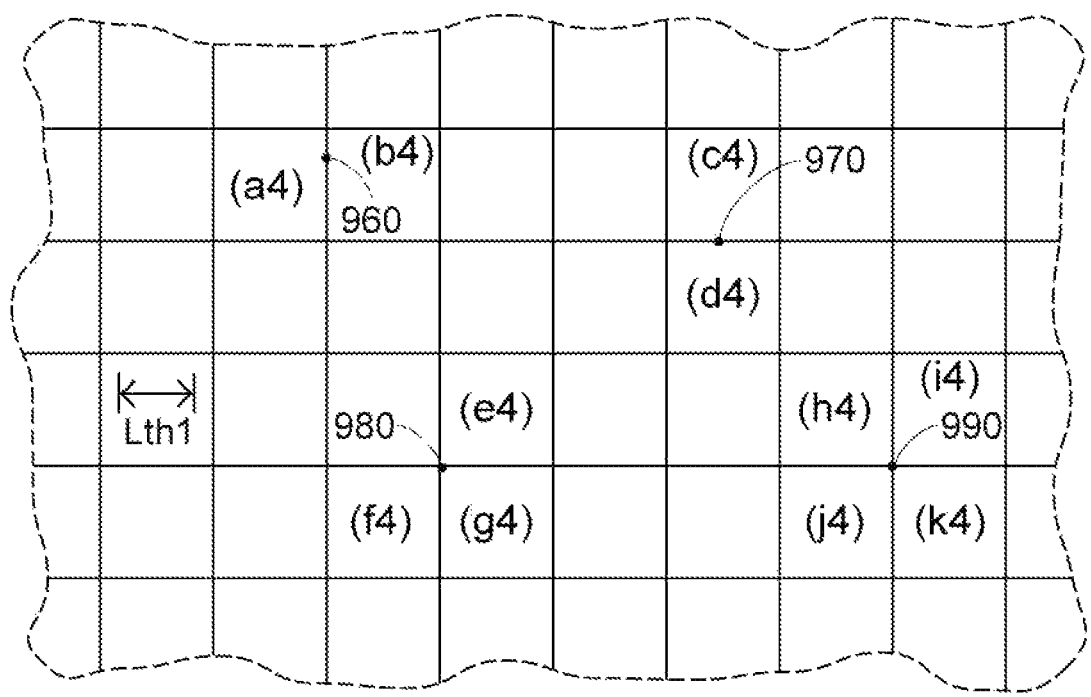

The stylus touch point 970 in FIG. 11D generates two touch points in the adjacent detecting areas (c4) and (d4), and the touch points are very close to each other. The distance between the two touch points generated by the stylus touch point 970 is shorter than the first threshold length (Lth1), and therefore the two touch points can be combined and the of the touch point type is determined by the first determining flow path (S906). Similarly, the position of the combined touch point also may be calculated.

The stylus touch point 980 in FIG. 11D generates three touch points in the adjacent detecting areas (e4), (f4) and (g4), and the three touch points are very close to each other. The distance between any two touch points generated by the stylus touch point 980 is shorter than the first threshold length (Lth1), and the three touch points can be combined and determined by the first determining flow path (S906). Similarly, the position of the combined touch point also may be calculated.

The stylus touch point 990 in FIG. 11D generates four touch points in the adjacent detecting areas (h4), (i4) (j4) and (k4), and the four touch points are very close to each other. The distance between any two touch points generated by the stylus touch point 990 is shorter than the first threshold length (Lth1), and thus the four touch points can be combined, and the touch point type is determined according to the first determining flow path (S906). Similarly, the position of the combined touch point also may be calculated.

Figure 12A:
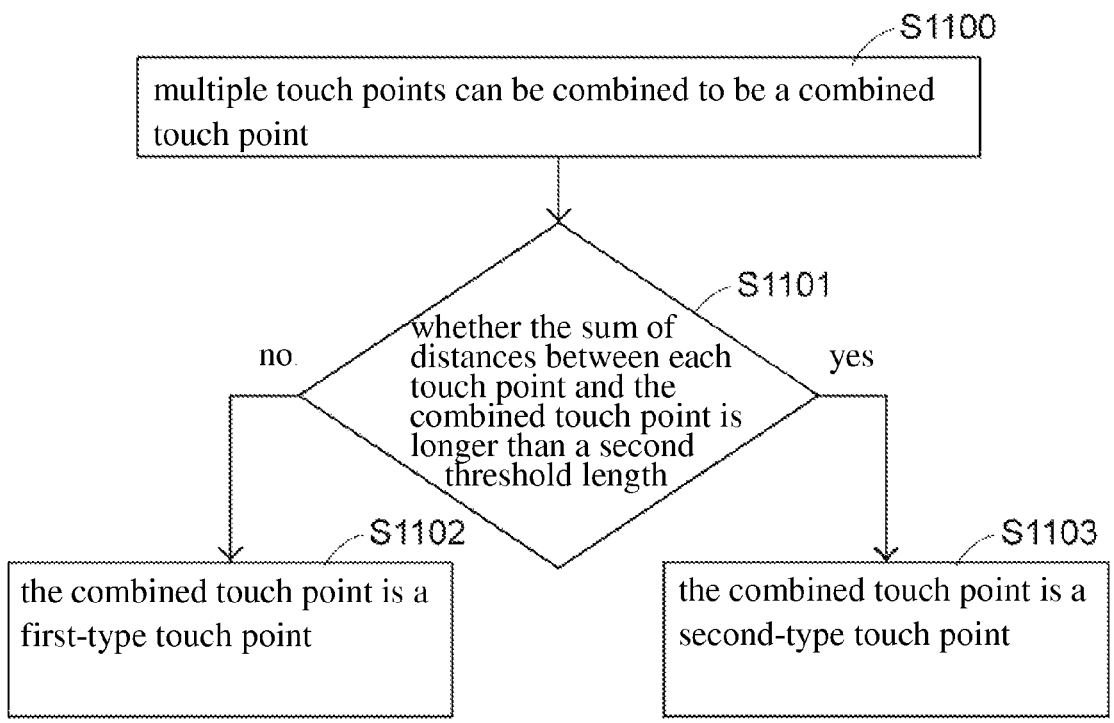
FIG. 12A is a first embodiment showing the first determining flow path.

When the combined touch point is generated, the control circuit 850 may further determine the type of the combined touch point via the first determining flow path. FIG. 12A is a first embodiment showing the first determining flow path. When it is determined that multiple touch points can be combined to be a combined touch point (step 1100), the sum of the distance between each touch point and the combined touch point is compared with the second threshold length (Lth2). When the sum of distance between each touch point and the combined touch point is shorter than a second threshold length (step 1101), it is determined that the combined touch point is a first-type touch point (step 1102); and when the sum of distances between each touch point and the combined touch point is longer than a second threshold length (step 1101), it is determined that the combined touch point is a second-type touch point (step 1103).

Figure 12B:
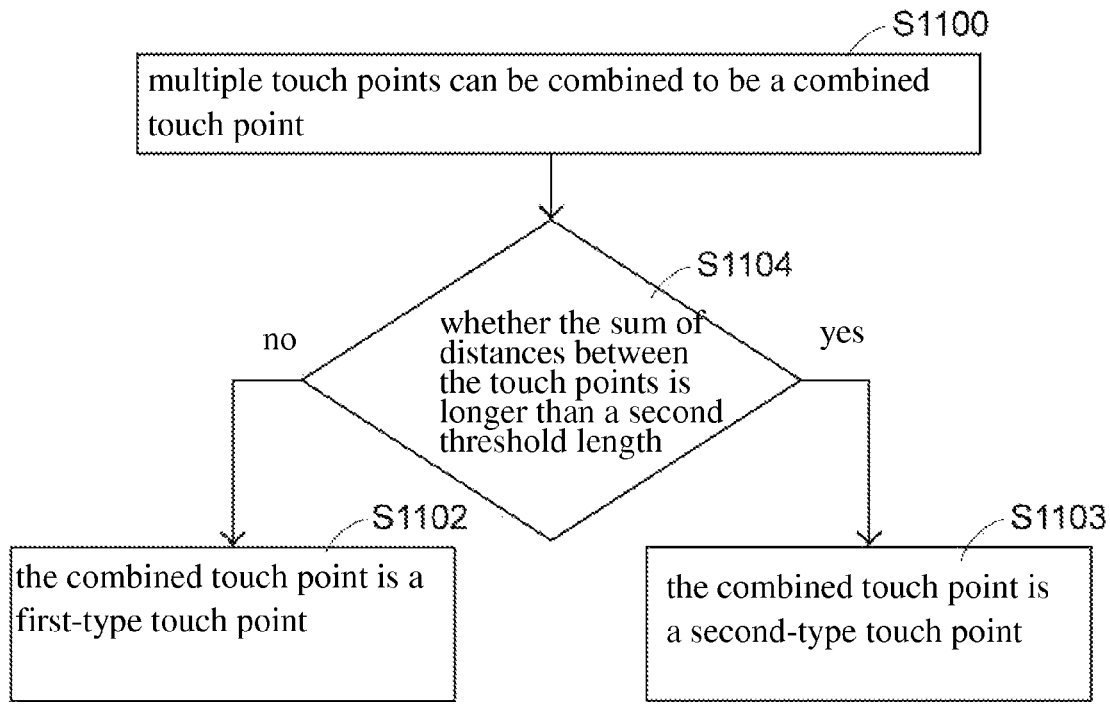
FIG. 12B is a second embodiment showing the first determining flow path.

FIG. 12B is a second embodiment showing the first determining flow path. In step S1104, the sum of distance between any two touch points is compared with the second threshold length (Lth2). When the sum of distance is shorter than the second threshold length (Lth2) (step S1104), it is determined that the combined touch point is the first-type touch point (step 1102), and on the contrary, when the sum of distance is longer than the second threshold length (Lth2) (step S1104), it is determined that the combined touch point is the second-type touch point (step 1103).

That is, when it is determined that multiple touch points are detected in the adjacent detecting areas and the touch points can be combined, the touch point type may be further determined according to the first determining flow path.

Therefore, when the electronic device is operated in the stylus mode, the combined touch point which is the first-type touch point is the effective touch point, and the combined touch point which is the second-type touch point is the ineffective touch point. When the electronic device is operated in the general mode, regardless of the first-type touch point or the second-type touch point, the combined touch points are the effective touch points.

In addition, according to the embodiment of the invention, when the touch points do not appear in adjacent detecting areas, the second determining flow path is used to determine the touch point type. In the second determining flow path, the circuit performance generated according to the value of the contact resistance is used to determine the touch point type.

The larger the contact area of the touch point is (for example, the touch point is generated by a finger or a palm), the larger the contact area between the upper and lower ITO layers is, and the smaller the contact resistance (Rz) is. On the contrary, the smaller the contact area of the touch point is (for example, the touch point is generated by stylus), the smaller the contact area of the upper and lower ITO layers is, and the larger the contact resistance (Rz) is.

Figure 13A:
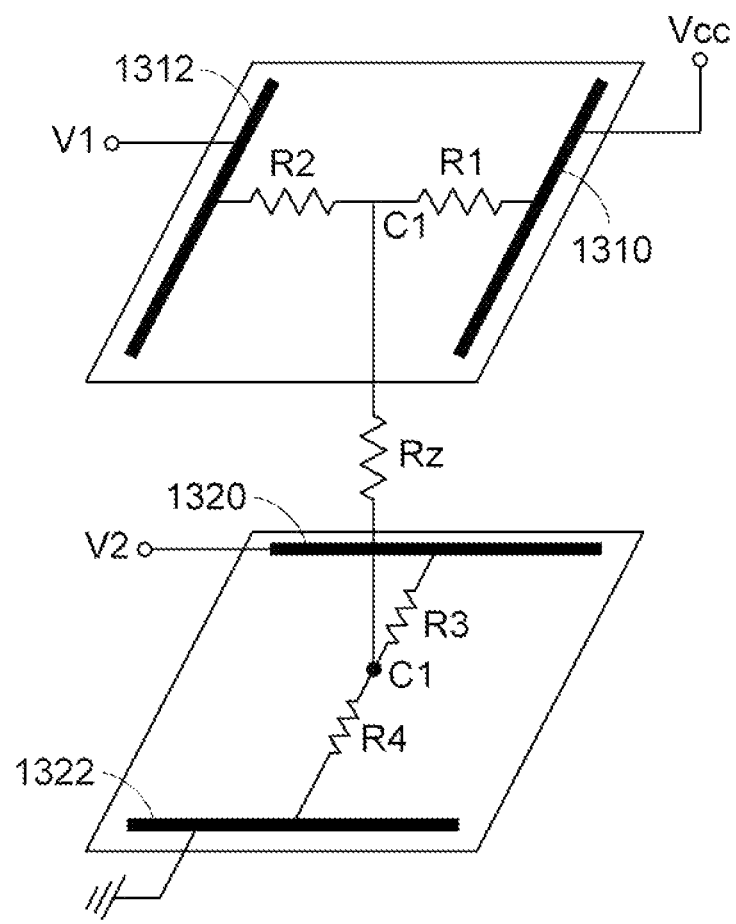
FIG. 13A is a schematic diagram showing a detecting area on the touch panel.

FIG. 13A is a schematic diagram showing the detecting area on the touch panel. The detecting area is defined by a first electrode 1310, a second electrode 1312, a third electrode 1320, and a fourth electrode 1322. The first electrode 1310 and the second electrode 1312 belong to a first-direction electrode (such as the X+ electrode and X− electrode), and the third electrode 1320 and the fourth electrode 1322 belong to a second-direction electrode (such as the Y+ electrode and Y− electrode). In addition, a touch point C1 is determined to be generated in the detecting area.

To determine the type of the touch point C1, the control circuit connects a voltage source (Vcc) to the first electrode 1310, connects the ground end to the fourth electrode 1322, connects the second electrode 1312 to the control circuit to provide a first voltage (V1) and connects the third electrode 1320 to the control circuit to provide a second electrode (V2).

Therefore, the second determining flow path in the first embodiment is determined by the first voltage (V1) and the second voltage (V2). As shown in FIG. 13A, the larger the contact area of the touch point is, the smaller the contact resistance (Rz) is. Therefore, the first voltage (V1) gets close to the second voltage (V2). That is, |V1−V2|<Vth1. On the contrary, the smaller the contact area of the touch point is, the larger the contact resistance (Rz) is, and therefore, the difference between the first voltage (V1) and the second voltage (V2) is larger. That is, |V1−V2|>Vth1. The Vth1 is the first preset threshold value.

As illustrated in the first embodiment in the second determining flow path, when |V1−V2|>Vth1, it is determined that the touch point C1 is the first-type touch point, and when |V1−V2|<Vth1, it is determined that the touch point C1 is the second-type touch point.

Furthermore, in the invention, after the first voltage (V1) and the second voltage (V2) are obtained, the value of the contact resistance (Rz) also may be directly calculated. Then, the touch point type is determined according to the value of contact resistance (Rz). That is, in the second embodiment of the second determining flow path, the contact resistance (Rz) is directly calculated, and the touch point type is determined according to the contact resistance (Rz).

For example, when the position of the second direction is calculated, the third electrode 1320 is connected to the voltage source (Vcc), and the fourth electrode 1322 is connected to the ground end. Therefore, the voltage on the touch point C1 is $$Vc1 = \frac{R4}{R3+R4}Vcc,$$

and the position of the second direction is obtained via the value Vc1. In addition, as shown in FIG. 13A, $$V1 = \frac{R4+Rz}{R4+Rz+R1}Vcc, \text{ and } V2 = \frac{R4}{R4+Rz+R1}Vcc.$$

That is, the control circuit may obtain the voltage values of Vc1, the V1 and the V2. As shown in the formula hereinbelow:

$$Vc1\left(\frac{V1}{V2}-1\right) = \left(\frac{R4}{R3+R4}Vcc\right)\left(\frac{R4+Rz}{R4}-1\right)$$

-continued
$$= \left(\frac{R4}{R3+R4}Vcc\right)\left(\frac{Rz}{R4}\right)$$
$$= Rz\left(\frac{Vcc}{R3+R4}\right),$$

wherein $$Vc1\left(\frac{V1}{V2}-1\right)$$

is a constant value, and $$\left(\frac{Vcc}{R3+R4}\right)$$

is the value of the current passing from the voltage source to the ground end when the position of the second direction is calculated. Therefore, the contact resistance (Rz) is deduced.

Consequently, the contact resistance is directly calculated in the second embodiment of the second determining flow path of the invention. After the contact resistance (Rz) is calculated, the contact resistance is compared with a preset contact resistance (Rz0). When the calculated contact resistance (Rz) is larger than the preset contact resistance (Rz0), the touch point C1 is the first-type touch point; on the contrary, when the calculated contact resistance (Rz) is smaller than the preset contact resistance (Rz0), the touch point C1 is the second-type touch point.

Figure 13B:
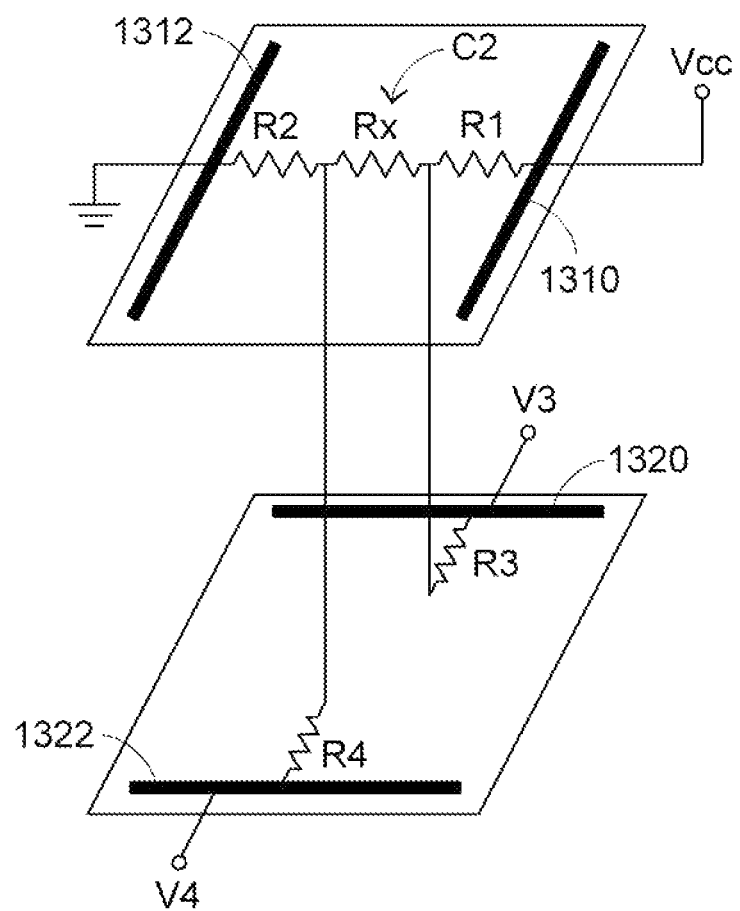
FIG. 13B is a schematic diagram showing another detecting area in the touch panel.

FIG. 13B is a schematic diagram showing the detecting area in the touch panel. The detecting area is defined by the first electrode 1310, the second electrode 1312, the third electrode 1320 and the fourth electrode 1322. The first electrode 1310 and the second electrode 1312 belong to the first-direction electrodes (such as the X+ electrode and X− electrode), and the third electrode 1320 and the fourth electrode 1322 belong to the second-direction electrodes (such as the Y+ electrode and Y− electrode). In addition, it is determined that the detecting area has a touch point C2. According to the third embodiment of the second determining flow path, to determine the type of the touch point C2, the control circuit connects a voltage source (Vcc) to the first electrode 1310, connects the ground end to the second electrode 1312, connects the third electrode 1320 to the control circuit to provide a third voltage (V3), and connects the fourth electrode 1322 to the control circuit to provide a fourth voltage (V4).

The type of the touch point C2 is determined by the third voltage (V3) and the fourth voltage (V4). As shown in FIG. 13B, R1, Rx and R2 form a strip-shaped ITO layer. As a result, the larger the contact area of the touch point is, the longer the strip-shaped ITO layer occupied by the resistor Rx is, and the larger the value of Rx is. Therefore, the difference between the third voltage (V3) and the fourth voltage (V4) is larger, and that is |V3−V4|>Vth2. On the contrary, when the contact area of the touch point is small, the resistor Rx is small. Therefore, the third voltage (V3) and the fourth voltage (V4) is closer to each other, and that is |V3−V4|<Vth2. The Vth2 is the second preset threshold value.

As illustrated in the third embodiment of the second determining flow path, when |V3−V4|<Vth2, the touch point C2 is determined to be the first-type touch point. On the contrary, when |V3−V4|>Vth2, the touch point C2 is determined to be the second-type touch point.

Therefore, when the electronic device is operated in the stylus mode, the touch point is the effective touch point when the touch point is determined to be the first-type touch point, and the touch point is the ineffective touch point when the touch point is determined to be the second-type touch point. When the electronic device is operated in the general mode, both the first-type touch point and the second-type touch point are effective touch points.

In addition, according to the embodiments of the invention, when the touch point is located in the single detecting area, the second determining flow path is used to determine the touch point type. In the three embodiments of the second determining flow path, the touch point type is determined according to the generated circuit performance corresponding to the value of the contact resistance.

The invention discloses an electronic device with a touch panel and the method for controlling the same. The touch panel of the electronic device may be divided into multiple detecting areas and may detect multiple positions of the touch points. In addition, the electronic device can be operated in a stylus mode or a general mode. When the user chooses the stylus mode, the first-type touch point is determined to be the effective touch point and the second-type touch point is determined to be an ineffective touch point. When the user chooses the general mode, both the first-type touch point and the second-type touch point are determined to be the effective touch point.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A method for controlling an electronic device with a touch panel, comprising the steps of:
   determining that the electronic device is operated in a stylus mode or a touch mode;
   detecting a first-type touch point and a second-type touch point on the touch panel, wherein a contact area of the first-type touch point is smaller than a contact area of the second-type touch point;
   determining the first-type touch point to be an effective touch point and the second-type touch point to be an ineffective touch point when the first-type touch point and/or the second-type touch point are detected on the touch panel and when the electronic device is operated in the stylus mode; and
   determining the first-type touch point or the second-type touch point detected on the touch panel to be the effective touch point when the electronic device is operated in the touch mode.

2. The method according to claim 1, wherein the touch panel is a resistive touch panel.

3. The method according to claim 1, wherein the first-type touch point is a small-area touch point, and the second-type touch point is a large-area touch point.

4. The method according to claim 1, wherein the first-type touch point is a stylus touch point, a penpoint touch point or a sharp object touch point, and the second-type touch point is a finger touch point or a palm touch point.

5. The method according to claim 1, wherein the stylus mode and the touch mode are chosen via a screen option displayed on the touch panel.

6. The method according to claim 1, wherein the electronic device is set to be at the stylus mode when a stylus is taken out of a stylus slot of the electronic device; and the electronic device is set to be at the touch mode when the stylus is not taken out of the stylus slot.

7. An electronic device comprising:
   a resistive touch panel including:
      a first-direction first electrode group composed of in electrodes,
      a first-direction second electrode group composed of in electrodes, a second-direction first electrode group composed of n electrodes, and a second-direction second electrode group composed of n electrodes, wherein the 2m+2n electrodes divide the resistive touch panel into m.times.n detecting areas;
   a multiplex switching circuit connected to all the 2m+2n electrodes; and
   a control circuit connected to the multiplex switching circuit, and capable of controlling the multiplex switching circuit and obtaining a touch point when a touch action is generated;
   wherein the control circuit is capable of determining a stylus mode or a touch mode, wherein the stylus mode is different from the touch mode, wherein the control circuit is capable of detecting a first type touch point and a second type touch point, wherein a contact area of the first-type touch point is smaller than a contact area of the second-type touch point, wherein the control circuit is capable of determining the first-type touch point to be an effective touch point and the second-type touch point to be an ineffective touch point when the first-type touch point and/or the second-type touch point are detected on the touch panel and when the electronic device is operated in the stylus mode, and determining the first touch point or the second touch point to be the effective touch point when the electronic device is operated in the touch mode.

8. The electronic device according to claim 7, wherein the first-type touch point is a small-area touch point, and the second-type touch point is a large-area touch point.

9. The electronic device according to claim 7, wherein the first-type touch point is a stylus touch point, a penpoint touch point or a sharp object touch point, and the second-type touch point is a finger touch point or a palm touch point.

10. The electronic device according to claim 7, wherein the stylus mode and the touch mode are chosen via a screen option displayed on the touch panel.

11. The electronic device according to claim 7, wherein the electronic device is set to be a stylus mode when a stylus is taken out of a stylus slot of the electronic device; and the electronic device is set to be a touch mode when the stylus is not taken out of the stylus slot.

12. The electronic device according to claim 7, wherein the electronic device is a mobile phone, a personal computer or a personal digital assistant (PDA).

* * * * *